US006477201B1

(12) United States Patent
Wine et al.

(10) Patent No.: US 6,477,201 B1
(45) Date of Patent: Nov. 5, 2002

(54) CONTENT-ADAPTIVE COMPRESSION ENCODING

(75) Inventors: Charles Martin Wine, Princeton, NJ (US); Glenn Arthur Reitmeier, Yardley, PA (US); Thomas Michael Stiller, Ewing, NJ (US); Michael Tinker, Yardley, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/083,451

(22) Filed: May 22, 1998

(51) Int. Cl.[7] .................................................. H04N 7/36
(52) U.S. Cl. .................................. 375/240.08; 382/243
(58) Field of Search ........................... 375/240, 240.08; 382/243

(56) References Cited

U.S. PATENT DOCUMENTS 5,802,220 A * 9/1998 Black et al. ................. 382/276

FOREIGN PATENT DOCUMENTS

| EP | 0 676 899 A | 10/1995 | ............ H04N/7/26 |
|---|---|---|---|
| EP | 0 739 141 A | 10/1996 | ............ H04N/7/32 |
| EP | 0 790 741 A | 8/1997 | ............ H04N/7/26 |

OTHER PUBLICATIONS

Feng et al.: "Adaptive object tracking and video compression with dynamic contours", NRSC 98, IEEE XP002112425ISBN: 0–7803–5121–5, pp. INV3/1–26.*
J. Bergen, P. Anandan, K. Hanna, R. HIngorani, "Hierarchical Model–Based Motion Estimation", Proc. of European Conference on Computer Vision–92, Mar. 23, 1992.

Yutao Feng Et Al: "Adaptive object tracking and video compression with dynamic contours", Proceedings of the Fifteenth National Radio Science Confreence, NRSC '98 (CAT. No. 98EX109) Proceedings of the Fifteenth National Radio Science Conference. NRSC '98, Cairo, Egypt, Feb. 24–26, 1998, New York, NY, USA, IEEE, USA, pp. INV3/1–26 XP002112425ISBN: 0–7803–5121–5 p. 3–6, line 1—pp. 3–6, line 32 p. 3–19,line 6–p. 3–19, line 16.

Yaser Yacoob Et Al: "Computer Spatio–Temporal Representations of Human Faces", Proceedings of the Computer Society Conference on Computer Vision a Pattern Recognition, Seattle, Jun. 21–23, 1994, pp. 70–75, Institute of Electrical Electronics Engineers XP000515823ISBN: 0–8186–5827–4 *Section "2 Tracking Face Regions"* *Section "3.4 Computing basic action cues"*.

Eleftheriadis A Et Al: "Automatic Face Location Detection and Tracking for Model–Assisted Coding of Video Teleconferencing Sequences at Low Bit–Rates" Signal Processing. Image Communication, vol. 7, No. 3, Sep. 1, 1995, pp. 231–248, XP000523869 ISSN: 0923–5965 The Whole Document.

PCT International Search Report our reference PCT 12097PCT Application No. PCT/US99/11316 filing date May 21, 1999.

* cited by examiner

Primary Examiner—Howard Britton
(74) Attorney, Agent, or Firm—William J. Burke (57) ABSTRACT

A subjective evaluator delineates regions of an information space to be encoded in a qualitatively preferential or non-preferential manner such that the encoded information space comprises one or more of normal, emphasized or de-emphasized information content.

20 Claims, 4 Drawing Sheets

CONTENT-ADAPTIVE COMPRESSION ENCODING

The invention relates to compression encoding of information streams and, more particularly, the invention relates to content-adaptive compression encoding of information streams to selectively provide information emphasis and/or de-emphasis.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

In an MPEG-like motion video compression process, it is known to use a quantity called Mquant to determine the quality of the encoding of each 16 picture element (pixel) by 16 pixel macroblock in a video frame or picture. That is, a rate-control process determines a value of Mquant for each macroblock in a picture to produce (at a decoder) the best quality picture without exceeding the available bit budget. Lower values of Mquant, which result in higher bit allocations and correspondingly better picture quality, are typically assigned to macroblocks within regions of low activity (i.e., low luminance frequency), since the human eye is more sensitive to such low frequency video information. Similarly, higher values of Mquant, which result in lower bit allocations and correspondingly lower picture quality, are typically assigned to macroblocks within regions of high activity (i.e., high luminance frequency), since the human eye is less sensitive to such high frequency video information.

Unfortunately, the mechanical assignment of Mquant and other qualitative parameters may produce encoded pictures having regions of special interest encoded with less than desired quality. For example, an advertisement for, e.g., a soap manufacturer may comprise an image of a person holding up a bar of soap. From the perspective of a soap manufacturer, the details of the bar of soap are very important, while the details of the person holding the soap are less important. Thus, the important image region is that image region including the bar of soap, rather than the image region including the person. However, if the above-described mechanical assignment of Mquant values is used, the qualitative emphasis may be misdirected to the person rather than the bar of soap.

Therefore, it is seen to be desirable to provide content-adaptive encoding of information, such as video information. Specifically, it is seen to be desirable to provide content-adaptive encoding of information effectuating a selective enhancement or degradation of information quality, such as video information quality.

SUMMARY OF THE INVENTION

The invention comprises a method and concomitant apparatus for providing selective enhancement and/or degradation of an information frame using content-based, regional analysis techniques. In general, the invention provides a subjective evaluator that delineates regions of an information space to be encoded in a qualitatively preferential or non-preferential manner such that the encoded information space comprises one or more of normal, emphasized or de-emphasized information content.

Specifically, the invention comprises a method for selectively encoding an information stream comprising a plurality of information frames, comprising the steps of: generating, in response to a subjective evaluation of the contents of an information frame, a mask indicative of a desired encoding quality adjustment for one or more information regions within said information frame; and associating each of said one or more information regions with respective encoding quality adjustment indicia; encoding said information frame in accordance with said encoding quality adjustment indicia.

In one embodiment of the invention, an operator delineates high value and/or low value regions of an information frame, illustratively a video frame. High value portions of the information frame are encoded at an enhanced quality level, while low value portions of the information frame are encoded at a degraded quality level.

In another embodiment of the invention, the quality enhancement and/or degradation is effected using one or more of several techniques including of a bit allocation method and a regional and sub-regional filtering method.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
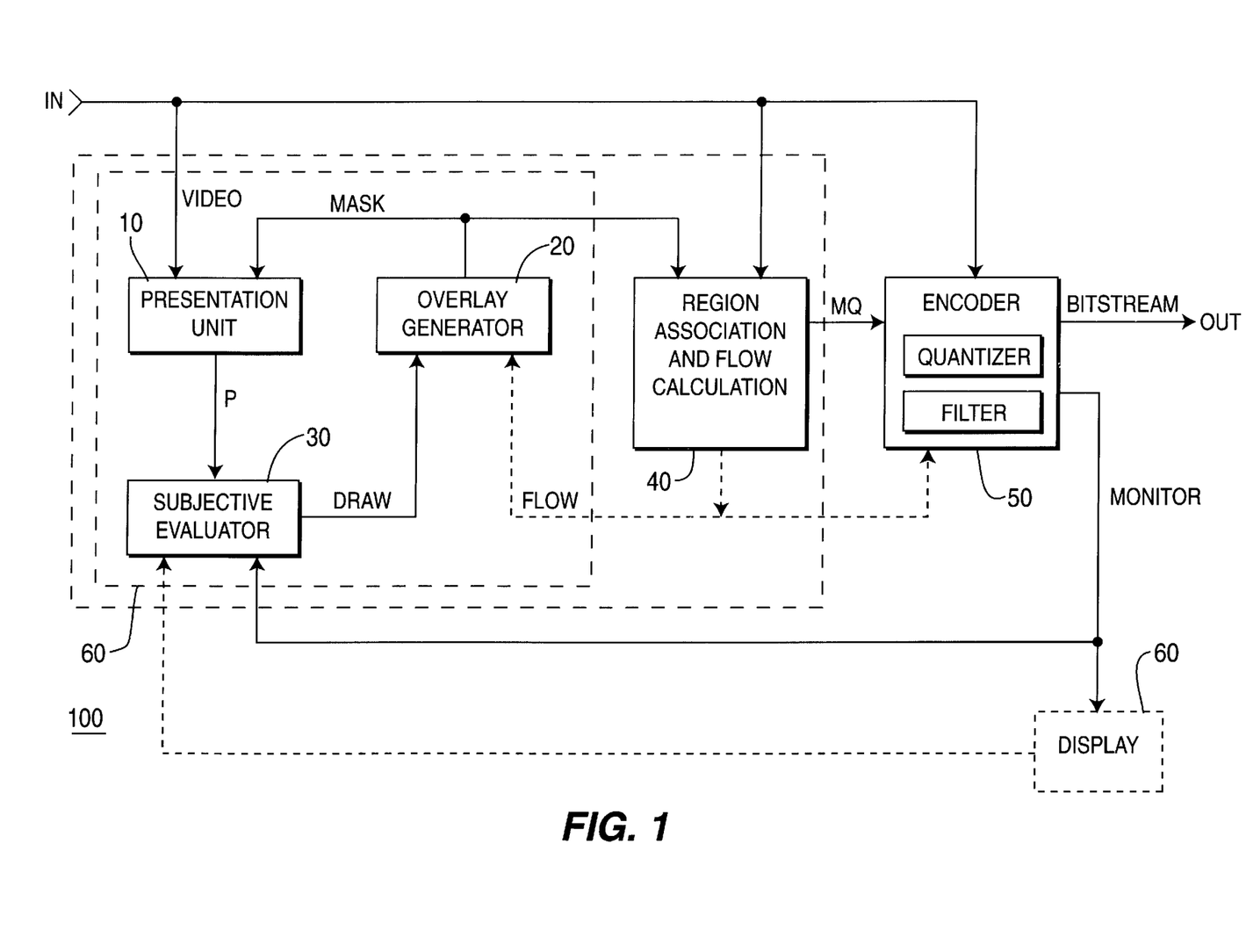
FIG. 1 depicts a high level block diagram of a system incorporating the teachings of the invention.

FIG. 1 depicts a high level block diagram of a system incorporating the teachings of the invention. Specifically, the system 100 comprises a first presentation unit 10, an overlay generator 20, a subjective evaluator 30, a region association and flow calculation unit 40, an encoder 50 and an optional second presentation unit 60. The system 100 receives an information stream IN comprising a plurality of information frames, illustratively a video information stream. In response to a subjective evaluation of the relative value of the one or more intra-frame information regions within information stream IN, the system 100 encodes the information stream in a manner that selectively enhances or degrades the one or more intra-frame information regions to produce an encoded output stream OUT.

In the embodiment of FIG. 1, the input information stream IN, illustratively a video information stream, is coupled to the first presentation unit 10, the region association and flow calculation unit 40 and the encoder 50. The first presentation unit 10 produces a presentation signal P that is coupled to the subjective evaluator 30. In the case of a video information stream, the presentation signal P comprises, e.g., a display of a single video frame. The subjective evaluator 30 performs a content-based evaluation of the information within the presented information frame and responsively produces an output signal DRAW that is coupled to the overlay generator 20, illustratively an on-screen graphics display generator.

The overlay generator 20 produces, in response to the evaluator output signal DRAW, a mask signal MASK that is coupled to the first presentation unit 10 and to the region association and flow calculation unit 40. The first presentation unit 10, in response to the mask signal MASK, produces, in the case of a video information input signal IN, an image comprising the video information frame and the mask overlay that delineating of one or more intra-frame information regions within the video information frame. The subjective evaluator 30 interactively modifies positional parameters and/or qualitative impact parameters of the mask by modifying the subjective evaluator output signal DRAW in response to the subjective evaluator input signal P.

Positional parameters of the mask comprise those parameters that associate the mask geometry with the desired intra-frame information regions targeted by that geometry. For video information streams, positional parameters are described in terms of pixels, blocks, macroblock, slices, information segments, chrominance or luminance frequency bands, high luminance transitions (i.e., "object edges") and the like. For other information streams appropriate position parameters may be readily defined. For example, in the case of audio information streams, positional parameters may comprise audio frequency bands associated with a high value speaker in an advertising campaign featuring that speaker. In the case of three dimensional (3D) audio streams, positional parameters may comprise volumetric parameters of the intended listening space (e.g., an information consumer's living room, the confines of a stand-alone video game and the like).

Qualitative impact parameters of the mask comprise those parameters that define quality, or fidelity, of the encoding of the delineated region during an encoding process. For example, in the case of a video information stream subjected to an MPEG encoding process, qualitative impact parameters comprise quantization level (i.e., allocated bit density of a region), resolution, color depth, motion vector accuracy, encoding accuracy and the like. For other information streams appropriate qualitative parameters may be readily defined. For example, in the case of audio information streams, qualitative parameters may comprise bit allocation, effective sampling rate and the like. In the case of 3D audio, qualitative parameters may comprise positional accuracy (i.e., phase accuracy), effective sampling rate, surround sound channel allocation and the like.

Each delineated intra-frame information region is associated with a qualitative enhancement or qualitative degradation indicium. In the case of a video information frame, the qualitative enhancement and qualitative degradation indicia may comprise, e.g., different colors of an on-screen graphics layer produced by the overlay generator 20 and displayed by the first presentation unit 10. For example, regions of interest delineated or drawn with a first selected color or set of colors may be deemed relatively important and, therefore, include information that should be qualitatively enhanced to achieve a content-based purpose (e.g., visually or aurally emphasize an advertised product). Regions of interest drawn with a second selected color or set of colors may be deemed with a relatively unimportant and, therefore, include information that may be qualitatively degraded without materially effecting the content-based purpose (e.g., visually or aurally de-emphasize non-product and/or background information in an advertisement).

The region association and flow calculation unit 40 produces, in response to the input information stream IN and the associated mask signal MASK, an qualitative parameter modification signal MQ, that is coupled to the encoder 50. The region association and flow calculation unit 40 performs a regional association function and, if applicable, a motion vector calculation function.

With respect to the regional association function, the region association and flow calculation unit 40 identifies, in the case of a video information frame, those pixels, blocks, macroblocks and the like that are associated with a delineated intra-frame region. In this manner, the intra-frame information associated with the delineated regions is specifically identified so that subsequent encoding or processing may be performed in accordance with the qualitative impact parameters of the delineated region. Thus, in the case of a block-based encoding system, such as an MPEG video encoding system, each macroblock within a "qualitative enhancement" region or a "qualitative degradation" region is associated with, respectfully, a qualitative enhancement factor or a qualitative degradation factor that operates to, respectfully, increase or decrease the qualitative parameter associated with the respective region.

Consider the case of a qualitative parameter comprising a quantization parameter, i.e., the number of bits allocated to a macroblock during a block-based encoding process. The qualitative enhancement factor operates to increase the bit allocation to those macroblocks within a "qualitative enhancement" region. Similarly, the qualitative degradation factor in this case operates to decrease the bit allocation to those macroblocks within a "qualitative degradation" region.

With respect to the motion vector calculation function, the region association and flow calculation unit 40 optionally produces, in response to differences between an input information frame and a subsequent information frame, an output signal FLOW indicative of the frame to frame motion of, e.g., the video information underlying each delineated intra-frame information region. This output signal FLOW is coupled to the overlay generator which responsively adjusts the positional parameters of the mask. In this manner, the quality parameter enhancement or degradation imparted to the intra-frame information region(s) delineated by the original mask remains with the appropriate information region (s). For example, in the case of soap advertisement, a delineated enhancement region including the bar of soap will move as the bar of soap moves (e.g., a camera panning).

Encoder 50 comprises standard encoder functions such as quantization control and filtering functions. Encoder 50 receives the qualitative parameter modification signal MQ and the associated sub-regions, such as associated input video macroblocks from the input information stream IN. The encoder 50 encodes each macroblock in accordance with its associated qualitative parameter modifier to produce an output information stream OUT. In one embodiment of the invention, the qualitative parameter modification signal MQ comprises a percentage increase (enhancement) or decrease (degradation) factor that is applied to the "normal" bit allocation for the macroblock. That is, if the macroblock would normally be encoded using N bits (based on whichever mechanical bit allocation algorithm produces a "normal" allocation), the macroblock will instead be encoded using N±(MQ*N) bits. The encoded macroblock is optionally coupled to a monitor output MONITOR.

The output signal FLOW of the motion vector calculation unit 40 may comprise any suitable indicator of regional information flow. For example, in the case of a video processing system, an optical flow may be defined as is a per pixel, fractional pixel estimation of the motion between a pair of pictures. Thus, an inter-picture or inter-frame pixel level estimation of motion may be associated with one or more macroblocks or regions defining a qualitative enhancement or qualitative degradation region. In this manner, inter-frame motion compensation may be implemented without the use of "boxes" or other predefined motion regions. Optical flow techniques are disclosed a paper written by Bergen et al. for the Mar. 23, 1992 European Conference on Computer Vision (ECCV '92) entitled "Hierarchical Model-Based Motion Estimation," incorporated herein by reference in its entirety. One skilled in the art will understand how to implement, in the instant invention, the optical flow techniques described in the ECCV '92 paper.

Encoder 50 optionally produces an output signal FLOW that is functionally equivalent to, and used in the same manner as, the output signal FLOW provided by the region association and flow calculation unit 40. If the encoder 50 comprises a block-base encoder as previously discussed, then the output signal FLOW may comprise motion vectors generated within the inter-frame motion prediction portion of the encoder 50. To the extent that the qualitative parameter modification signal MQ comprises a motion vector degradation, the resulting output signal FLOW will also be degraded. However, such degradation may be acceptable if additional interactions during mask construction/editing is acceptable.

Optional second presentation unit 60 may be used to present the encoded result to subjective evaluator 30. If the encoded result is not satisfactory, then the subjective evaluator may adjust its output signal DRAW to adjust positional and/or qualitative parameters of the delineated region(s).

In another embodiment of the invention, the subjective evaluator 30 causes regions of interest to be delineated using five different colors. A first color is used to delineate regions that are to be unchanged. Macroblocks within the first region will be allocated exactly those bits that would normally be allocated by a "normal" bit allocation algorithm, such as the algorithms utilizing frequency content as a metric. A second color is used to delineate regions that are to be quantization enhanced. Macroblocks within the second region will be allocated more bits during encoding on, e.g., a percentage or predetermined increase basis. A third color is used to delineate regions that are to be quantization degraded. Macroblocks within the third region will be allocated fewer bits during encoding on, e.g., a percentage or predetermined increase basis. A fourth color is used to delineate regions that are to be degraded by spatial pre-filtering to reduce information bandwidth. Macroblocks within the fourth region will be sub-sampled prior to encoding to reduce the amount of information representing the macroblock. A fifth color is used to delineate regions that are to be quantization degraded and further degraded by spatial pre-filtering. Macroblocks within the fifth region will be sub-sampled prior to encoding and allocated fewer bits during encoding.

The first presentation unit 10, overlay generator 20 and subjective evaluator 30 may be implemented as a video workstation 60 including an on-screen painting program. In this case, a human operator of the workstation (or expert software running within the workstation) provides subjective evaluation of the input video stream and provides the mask delineating the above-mentioned intra-frame regions. In the case of a video information stream, an evaluator such as the human operator or expert system, determines which portion or portions of a video information frame should be encoded at a different quality level. That is, the evaluator assesses the relative value, with respect to a predefined purpose, of content within the video information frame. In the case of emphasizing a product in an advertisement, the "live" product may be identified by expert software using, e.g., chroma-key, pattern matching or other known techniques.

Figure 2:
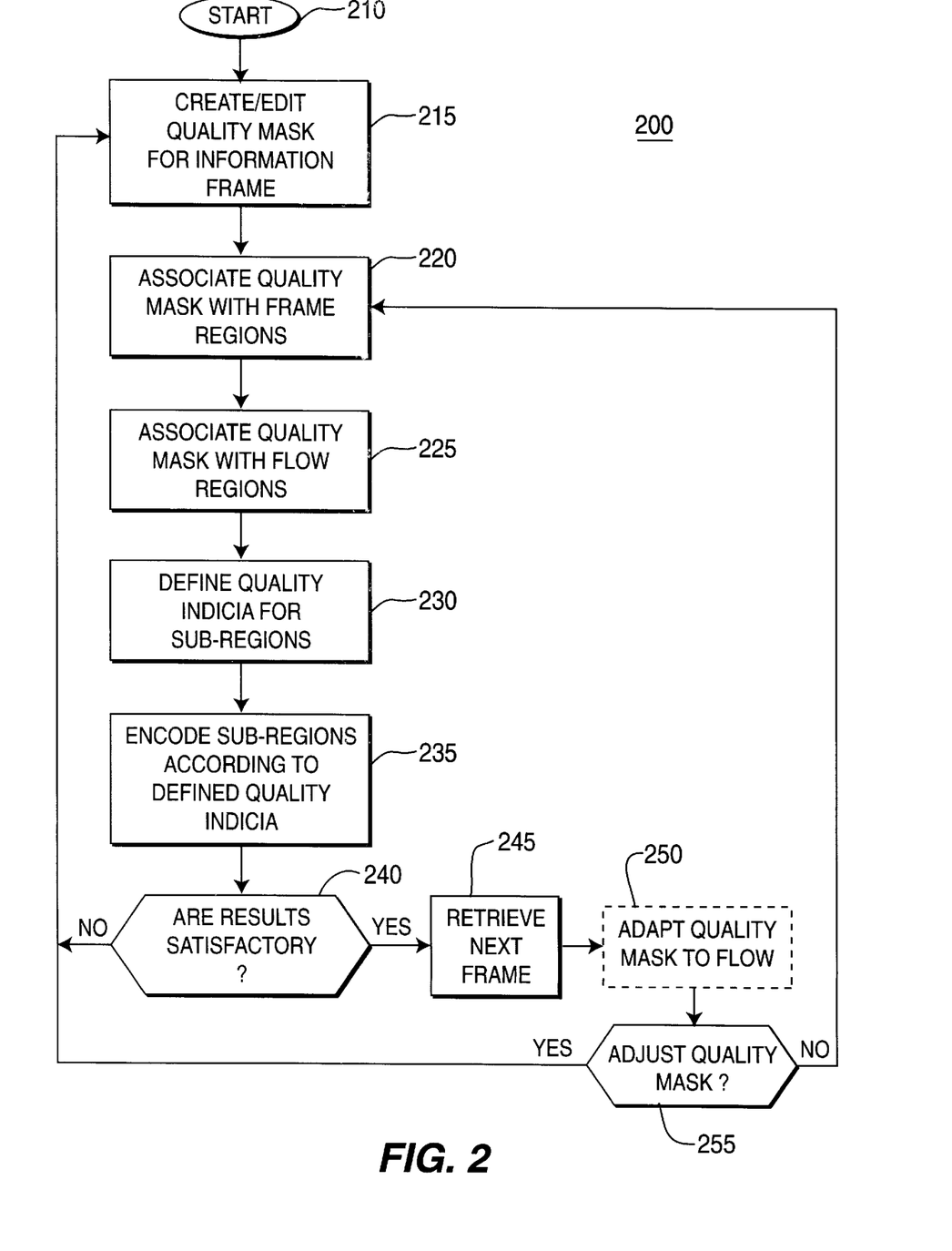
FIG. 2 depicts a flow diagram of a content-based encoding routine according to the invention.

FIG. 2 depicts a flow diagram 200 of a content-based encoding routine according to the invention. The routine is suitable for use in, e.g., a system such as described above with respect to FIG. 1, i.e., the workstation 60 in conjunction with the region association and flow calculation unit 40 and the encoder 50.

The routine 200 of FIG. 2 is entered at step 210 when, e.g., the workstation 60 receives an input video stream IN. The routine 200 proceeds to step 215, where a mask for a presently displayed information frame is created and/or edited by, e.g., a workstation operator. As previously discussed, the mask is used to delineate intra-frame information region(s) that are to be subjected to subsequent a qualitative enhancement or qualitative degradation during an encoding process. The routine 200 then proceeds to step 220.

At step 220, the quality impact of each delineated region identified by the mask are associated with the video information within the respective region. For example, the macroblocks within a particular region are associated with the qualitative impact parameter of the delineated region as defined by, e.g., the color used to delineate the region. The routine 200 then proceeds to step 225.

At step 225, the routine 200 optionally associates the mask (i.e., the delineated regions forming the mask) with one or more information flow regions. A flow region comprises an area or region of information space (i.e., video, audio and the like) that is associated with a spatio-temporal offset, such as an inter-frame motion estimation. The temporal offset provides information suitable for adapting the information space geometry of a delineated region to spatio-temporal changes within that information space. Optical flow and motion estimation may be effectively employed as flow region descriptors associated with intra-regions elements such as macroblocks, pixel regions, frequency bands and the like. The routine 200 then proceeds to step 230.

At step 230 quality indicia for each sub-region (e.g., macroblock) of a delineated region is defined. For example, quantization enhancement, quantization degradation and/or spatial pre-filtering parameters are defined for each sub-region. The routine 200 then proceeds to step 235.

At step 235, the sub-regions comprising the entire information frame are encoded. Those sub-regions associated with delineated regions are encoded according to the respective defined quality indicia. The encoded information frame comprises all the encoded sub-regions, quality enhanced, quality degraded and quality neutral. A portion of an encoding routine suitable for use in implementing step 235 will be described in more detail below with respect to FIG. 3. routine The routine 200 then proceeds to step 240.

At step 240 a query is made as to whether the resulting encoded information frame is satisfactory for the intended content-based purpose. If the query at step 240 is answered negatively, then the routine 200 proceeds to step 215, where the mask for the presently displayed information frame is edited to achieve a more satisfactory result. Steps 220 through 240 are then repeated. If the query at step 240 is answered positively, then the routine 200 proceeds to step 245, where the next information frame is retrieved from the input information stream (e.g., IN), and to step 250.

At step 250, the routine 200 optionally conforms the mask generated in step 215 to the flow region descriptors (e.g., optical flow or motion flow) of the underlying information within the delineated regions. The routine 200 then proceeds to step 255, where a query is made as to whether the adapted mask should be adjusted (i.e., does the mask suitably delineate the appropriate quality enhancement and degradation regions?). For example, after a number of frames the motion adaptation of the mask will not produce a satisfactory result. Moreover, in the event of a scene cut in a video stream (i.e., frame N having little in common with frame N+1), the mask will be virtually useless.

If the query at step 255 is answered negatively (i.e., no adjustment necessary), then the routine 200 proceeds to step 220, where the quality impact of each delineated region identified by the adapted mask are associated with the video information within the respective region. Steps 225 through 255 are then repeated.

If the query at step 255 is answered positively (i.e., at least some adjustment necessary), then the routine 200 proceeds to step 215, where the adapted mask is applied to the present information frame (i.e., the "adapting" frame is edited (or replaced) by, e.g., the workstation operator. Steps 220 through 255 are then repeated. The routine 200 continues until the entire input information stream has been satisfactorily processed, as described above.

With respect to step 250 above, the mask image is "dragged" along with the motion in the original image. This is done by, e.g., computing the optical flow field between successive frames of the original image. The mask is then warped with the flow field vectors. Warping comprises the process by which each pixel in a subsequent mask is taken from a first mask in accordance with its flow value, rather that a simple geometric distortion. For example, if the operator created a mask for frame 15 of a video sequence, then the flow is computed from frame 15 to frame 16 of the sequence. The mask is warped with this flow to create a mask for frame 16. The motion process is then repeated from frame 16 to frame 17. After a reasonable number of frames have been dragged along with the image motion, a new frame is created by the operator. The interval at which this is done is determined by the operator evaluating the fit of the motion compensated mask with the corresponding frames of the input at step 255.

In the case of a quality degradation region utilizing spatial pre-filtering, the step of encoding 235 includes a pre-filtering step that is performed on the image to be encoded. Illustratively, a two-dimensional low-pass filter processes each pixel associated with a quality degradation region utilizing spatial pre-filtering. An example of such a low-pass filter is the simple separable $1/4, 1/2, 1/4$ three tap triangular function applied both horizontally and vertically. It is also known to those skilled in the art to apply sharper low-pass filter functions with more taps.

In the case of a quality degradation region utilizing quantization degradation, the mask image is processed to create a map of changes to Mquant. This process involves determining the average value of the mask, adjusting offset and gain to maintain a zero average, scaling the amplitude of the Mquant value to a user selected maximum value, and averaging all the values in, e.g., each 16×16 macroblock region.

After selectively applying spatial pre-filtering and/or quantization degradation, the resulting sub-regions (e.g., macroblocks) are encoded.

In the encoding process, an activity measure for each macroblock may be determined using a standard frequency analysis algorithm. The activity measure is used to preferentially allocate bits to lower frequency video information (i.e., video information that human vision is more sensitive to). The activity measure is set to a minimum value for all macroblocks to be enhanced. The minimum value assigned to a macroblock indicates to the rate control algorithm that the macroblock is likely to be allocated a greater number of bits for qualitative enhancement. This indication is important in that it helps the rate control algorithm ensure that the total bit budget for the information frame is not exceeded. It must be noted that the total bit budget for an information frame in an MPEG system is determined with respect to a video buffer verifier that is utilized in a known manner to prevent far end decoder overflow or underflow conditions.

Once the rate control algorithm has computed an Mquant value for each block, the quantization adjustment value (if any) computed from the mask processing step 230 is added to the Mquant value. This enhances or degrades the quality of the encoding for the selected regions of the picture.

Figure 3:
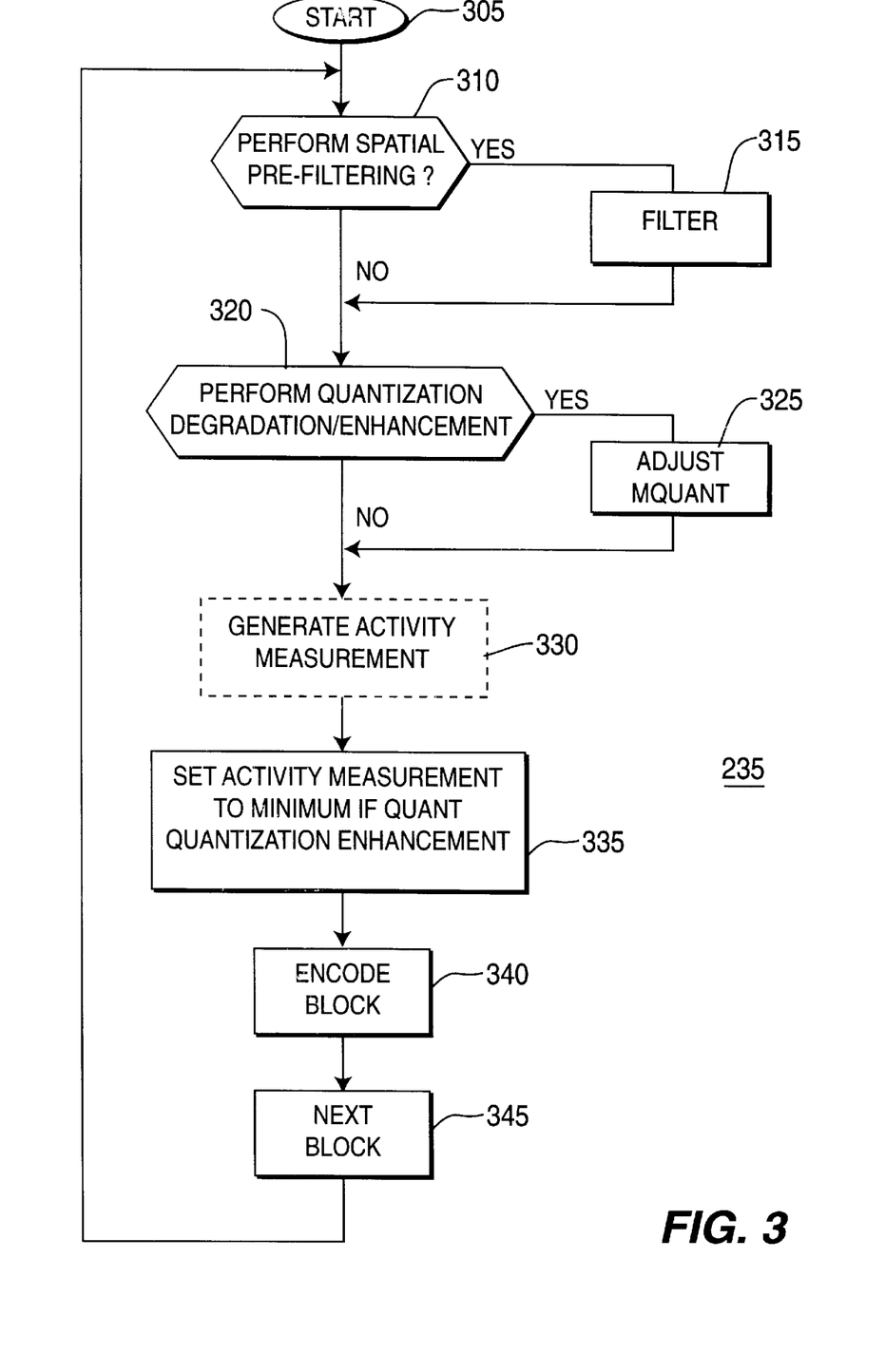
FIG. 3 depicts a flow diagram of a block encoding routine suitable for use in the content-based encoding routine of FIG. 2.

FIG. 3 depicts a flow diagram of a block encoding routine 235 suitable for use in the content-based encoding routine 200 of FIG. 2.

The routine 235 of FIG. 3 is entered at step 305 when, e.g., the encoder 50 receives an macroblock to be encoded and an associated qualitative impact parameter. As previously discussed, the qualitative impact parameter is determined with respect to the delineated region that includes the macroblock to be encoded. The routine 235 then proceeds to step 310.

At step 310 a query is made as to whether a spatial pre-filtering operation should be performed upon the macroblock. This query is made by examining the qualitative impact parameter associated with the macroblock. If the query at step 310 is answered negatively, then the routine 235 proceeds to step 320. If the query at step 310 is answered affirmatively, then the routine 235 proceeds to step 315, where a filtering operation is performed using a known spatial filtering technique. The routine 235 then proceeds to step 320

At step 320 a query is made as to whether the macroblock is to be encoded using quantization degradation or quantization enhancement. This query is made by examining the qualitative impact parameter associated with the macroblock. If the query at step 320 is answered negatively, then the routine 235 proceeds to step 330. If the query at step 320 is answered affirmatively, then the routine 235 proceeds to step 325, where an adjustment to the Mquant value is made in accordance with the desired level of quantization degradation or quantization enhancement as indicated by the associated qualitative impact parameter. The routine 235 then proceeds to step 330.

At step 330 an activity measurement of the macroblock is optionally generated in a known manner. This activity measurement generation is not strictly necessary to practice the invention, but represents a typical rate control algorithm that implements a mechanical bit allocation based upon luminance frequency content within a video macroblock (or some other measurement of "busyness"). The routine 235 then proceeds to step 340.

At step 340, the macroblock is encoded according to a bit allocation profile that is determined with respect to the Mquant value, other qualitative impact parameters associated with the macroblock, and the generated activity measurement (if used). The routine 235 then proceeds to step 345 to wait for the next macroblock to be encoded and its associated qualitative impact parameter. Upon receiving this information the routine 235 proceeds to step 310, where the entire process is repeated.

It must be noted that the routine 235 omits, for the sake of clarity, various well-known steps in the encoding process. However, those skilled in the art will readily comprehend the impact of the invention upon the encoding process and include the conventional steps omitted herein.

Figure 4:
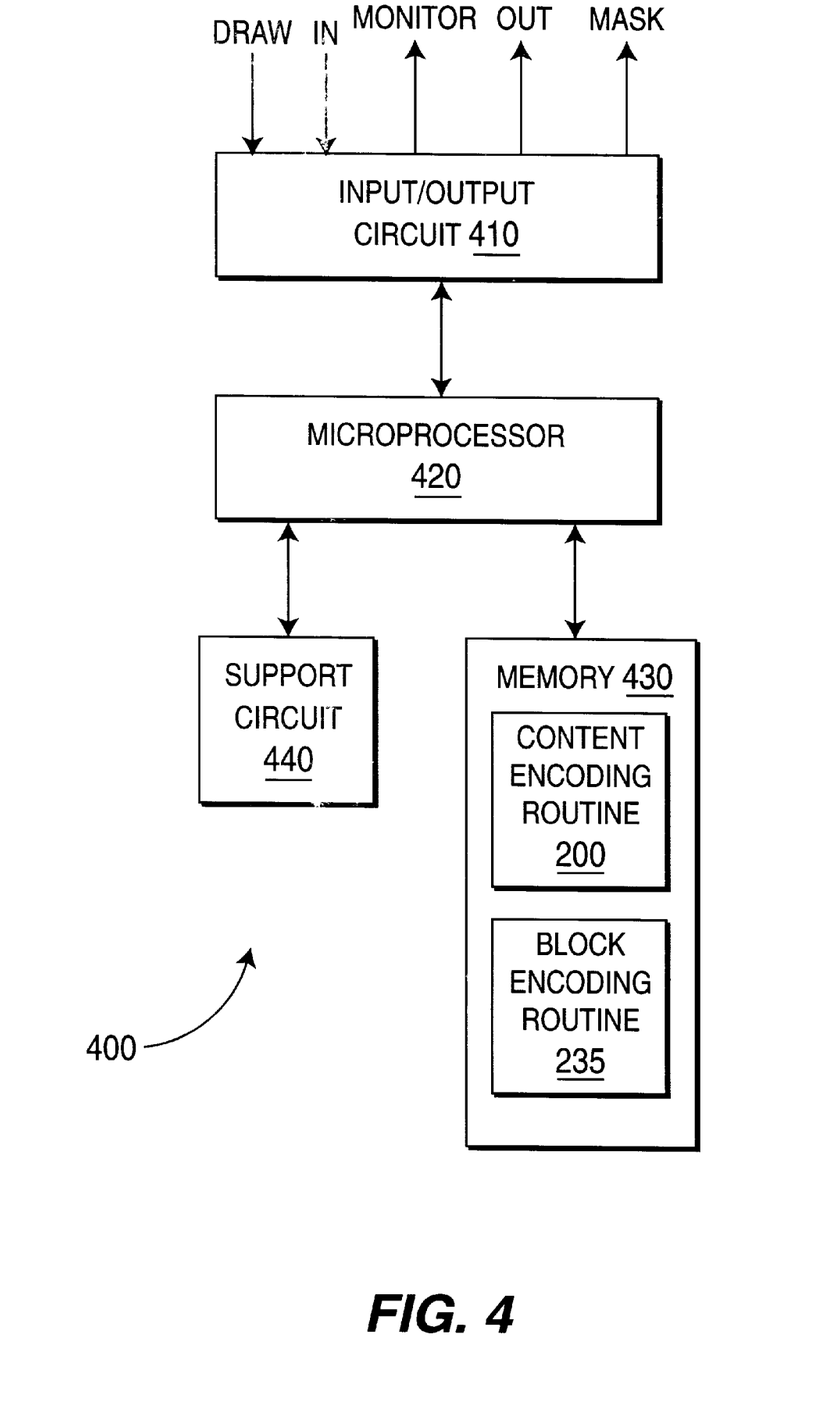
FIG. 4 depicts an alternate embodiment of a portion of the system of FIG. 1.

FIG. 4 depicts an alternate embodiment of a portion of the system of FIG. 1. Specifically, FIG. 4 depicts a control apparatus 400 that may be used in place of the overlay generator 20, region association and flow calculation unit 40 and encoder 50 of the system 100 of FIG. 1.

The control apparatus 400 comprises a microprocessor 420 as well as memory 430 for storing the content-based encoding routine 200 and the block encoding routine 300 suitable for use in the content-based encoding routine 200. The microprocessor 430 cooperates with conventional support circuitry 440 such as power supplies, clock circuits, cache memory and the like as well as circuits that assist in executing the software routines. As such, it is contemplated that some of the process steps discussed herein as software processes may be implemented within hardware, e.g., as circuitry that cooperates with the microprocessor 420 to perform various steps.

The control apparatus 400 also contains input/output (I/O) circuitry 410 that forms an interface between the subjective evaluator 30, the first presentation unit 10 and the optional second presentation unit 60 of the system 100 of FIG. 1. Although the control apparatus 400 is depicted as a general purpose computer that is programmed to perform encoding functions in accordance with the present invention, the invention can be implemented in hardware as an application specific integrated circuit (ASIC). As such, the process steps described herein are intended to be broadly interpreted as being equivalently performed by software, hardware, or a combination thereof. Those skilled in the art should realize that the embodiments described above can be implemented as a software method as well as the hardware shown. In such an implementation, the function of each block in FIG. 1 becomes an executable routine for a computer system or other processing unit.

Although various embodiments which incorporate the teachings of the present invention have been shown and described in detail herein, those skilled in the art can readily devise many other varied embodiments that still incorporate these teachings.

What is claimed is:

1. A method for selectively encoding an information stream, said Information stream comprising a plurality of information frames, said method comprising the steps of:

(a) generating, in response to a subjective evaluation of the contents of an information frame, a mask indicative of a desired encoding quality adjustment for one or more information regions within said information frame;

(b) associating each of said one or more information regions with respective encoding quality adjustment indicia; and (c) encoding said information frame in accordance with said encoding quality adjustment indicia.

2. The method of claim 1, further comprising the step of:

(d) adapting said mask to a subsequent information frame.

3. The method of claim 2, wherein said step of adapting comprises the steps of:

comparing said information frame and said subsequent information frame to produce difference information;

extracting, from said difference information, inter-frame motion indicia of information sub-regions within each of said information regions; and warping, according to said extracted inter-frame motion indicia, said mask.

4. The method of claim 1, wherein:

said information stream comprises a video information stream; and said mask comprises a graphical overlay.

5. The method of claim 2, wherein said step of adapting comprises the steps of:

calculating an inter-frame flow descriptor relating an information frame mask geometry to a subsequent information frame mask geometry; and warping, according to said calculated inter-frame flow descriptor, said mask.

6. The method of claim 5, wherein said inter-frame flow descriptor comprises an optical flow descriptor.

7. The method of claim 5, wherein said inter-frame flow descriptor comprises a motion vector descriptor.

8. The method of claim 5, wherein said inter-frame flow descriptor comprises a frequency band flow descriptor.

9. The method of claim 1, wherein said mask utilizes color to delineate information regions having a different desired encoding quality.

10. The method of claim 9, wherein a first color is indicative of an information region to be qualitatively enhanced, and a second is indicative of an information region to be qualitatively degraded.

11. The method of claim 10, wherein qualitative information enhancement is provided by preferential bit allocation during an encoding step.

12. The method of claim 10, wherein qualitative information degradation is provided by at least one of information sub-sampling prior to an encoding step and non-preferential bit allocation during said encoding step.

13. The method of claim 1, wherein said desired encoding quality is attained using at least one of a bit allocation, regional filtering and sub-regional filtering method.

14. A computer readable media storing a computer program which, when executed by a computer, implements a method for selectively encoding an information stream, said information stream comprising a plurality of information frames, said method comprising the steps of:

(a) generating, in response to a subjective evaluation of the contents of an information frame, a mask indicative of a desired encoding quality adjustment for one or more information regions within said information frame;

(b) associating each of said one or more information regions with respective encoding quality adjustment indicia; and (c) encoding said information frame in accordance with said encoding quality adjustment indicia.

15. The computer readable media of claim 14, wherein the method implemented by said stored computer program comprises the step of:

(d) adapting said mask to a subsequent information frame.

16. The computer readable media of claim 15, wherein said step of adapting comprises the steps of:

comparing said information frame and said subsequent information frame to produce difference information;

extracting, from said difference information, inter-frame motion indicia of information sub-regions within each of said information regions; and warping, according to said extracted inter-frame motion indicia, said mask.

17. An apparatus for selectively encoding an information stream comprising a plurality of information frames, said apparatus comprising:

a subjective evaluator, coupled to receive said information stream, for subjectively evaluating at least one information frame and generating therefrom a signal indicative of a region of said information frame to be encoded according to a non-standard encoding preference;

a mask generator, coupled to receive said information stream and coupled to said subjective evaluator, for generating a mask delineating said region of said information frame to be encoded according to a non-standard encoding preference; and an encoder, coupled to receive said information stream and coupled to said mask generator, for encoding said information stream, wherein said region of said information frame to be encoded according to a non-standard encoding preference is encoded according to said non-standard encoding preference.

18. The apparatus of claim 17, wherein said non-standard encoding preference comprises one of a qualitative encoding enhancement or qualitative encoding degradation preference.

19. The apparatus of claim 17, further comprising:

a region association and flow calculator, coupled to receive said information stream and coupled to said mask generator, for associating information elements within said region of said information frame delineated by said mask with information elements of a successive information frame, and producing an output signal indicative of an inter-frame information flow.

20. The apparatus of claim 19, wherein:

said mask generator is coupled to said region association and flow calculator, and is responsive to said indicia of inter-frame information flow to warp said mask to conform to said inter-frame information flow.

* * * * *